3,444,295
ANABOLIC COMPOSITION COMPRISING 1,2α-METHYLENE-19-NOR TESTOSTERONE
Otto Engelfried, Hans-Gunter Lehmann, Friedmund Neumann, and Rudolf Wiechert, Berlin, Germany, assignors to Schering AG, Berlin, Germany
No Drawing. Filed Dec. 29, 1966, Ser. No. 605,562
Int. Cl. A61k *17/00;* C07c *171/06*
U.S. Cl. 424—243                          9 Claims

ABSTRACT OF THE DISCLOSURE

Novel 1,2α-methylene-19-nor-testosterone derivatives having anabolic activity and a process for the production thereof by dehydrogenation or dehydrohalogenation of the corresponding 1,2α-methylene-3-ketosteroids which are saturated in the A-ring.

---

This invention relates to novel 1,2α-methylene-19-nor-testosterone derivatives having anabolic activity, to a process for the production thereof, and to a method of compounding and using the same.

It is an object of the present invention to provide novel 1,2α-methylene - 19 - nor-testosterone derivatives which have anabolic activity.

It is another object of the present invention to provide compositions useful as therapeutic agents having marked anabolic activity, and with substantially none of the undesirable side effects of androgen.

It is still another object of the present invention to provide a highly economical process for the production of such testosterone derivatives.

Other objects will become apparent from the following description:

The novel 1,2α-methylene-19-nor-testosterone derivatives characterized by their anabolic activity have the following structure:

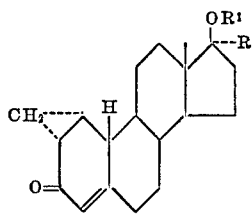

wherein R is hydrogen or a saturated or unsaturated, straight or branched alkyl and $R^1$ is hydrogen or acyl.

The term "acyl" or "acyl radical" in accordance with the present invention generally contemplates such acid residues which are normally used for esterification in steroid chemistry, and preferably acid residues of aliphatic carboxylic acids having from 1–12 carbon atoms. The acyl radicals may be saturated or unsaturated, straight or branched chain. Furthermore, the acyl radical may be a residue of mono- as well as of poly- carboxylic acids, of cycloaliphatic-, aromatic-, mixed aromatic, aliphatic or heterocyclic acids. The aforesaid acyl radicals contemplate also acid residues which carry the usual substituents including hydroxy, amino, and halogen, i.e., fluorine, bromine or iodine. Preferred acyl radicals are acetic acid, propionic acid, oenanthic acid, caproic acid, undecylic acid, trimethyl-acetic acid, halo-acetic acid, cyclopentyl-propionic acid; phenyl-acetic acid; phenoxy-acetic acid; dialkyl-amine-acetic acid, piperidino-acetic acid, succinic acid, benzoic acid, and the like. The term saturated or unsaturated, straight or branched alkyl or alkyl radical contemplates preferably lower alkyl and particularly methyl-, ethyl-, vinyl- and ethinyl radicals.

The novel 1,2α-methylene-19-nor-testosterone derivatives are produced by the dehydrogenation or dehydrohalogenation of the corresponding 1,2α-methylene-3-ketosteroids having a saturated A-ring. Optionally, the free 17-OH-group or 17-acyloxy-group attached to the primary product is either acylated or saponified, respectively.

The dehydrogenation of the saturated 4,5-C—C-bond in the steroids used as starting materials is carried out by methods which are known per se in steroid-chemistry for the introduction of double bonds. The dehydrogenation can be effected, for example, with selenium-dioxide or quinones, and preferably with 2,3-dichloro-5,6-dicyanbenzoquinone. The $\Delta^4$ double bond can be introduced also by way of the 4-halosteroids obtained, for example, by brominating 3-enol-esters. From the 4-halo steroids, the corresponding hydrogen-halide is then split off.

The esterification of the free 17-OH-group or the saponification of the 17-acyloxy-group which may be optionally carried out proceeds by methods which are known per se.

The novel steroid derivatives according to the present invention have an outstanding anabolic activity, whereby, in addition to the desirable anabolic effectiveness, the undesirable androgen side-activity is surprisingly low. This is illustrated by the following table, wherein the activities of 1,2α-methylene-19-nor-testosterone acetate (III) and 1,2α-methylene-19-nor-testosterone-propionate (II) are compared with the activity of the known testosterone-propionate (I). The test results specified in the table were determined by the usual anabolic/androgen tests after subcutaneous injection of the test substances to castrated rats. As comparison value, there was employed a dose, which produced a weight of tht levator-ani of at least 50 mg. per 100 g. rat (anabolic effect). The rate of the androgen effect is illustrated in the table by the weight of the seminal vesicle per 100 g. rat.

TABLE

| Substance | Dosage (mg.) | Levator-ani weight (mg.) | Seminal vesicle weight (mg.) |
| --- | --- | --- | --- |
| (I) Testosterone-propionate | 1 | 56 | 529 |
| (II) 1,2_-methylene-19-nor-testosterone-propionate | 0.1 | 55 | 147 |
| (III) 1,2_-methylene-19-nor-testosterone-acetate | 0.3 | 51 | 165 |

The novel testosterone derivatives of the present invention are compounded by the usual pharmaceutical methods and are used where medicines having anabolic activity are indicated. They can be applied orally as well as subcutaneously. The testosterone derivatives of the present invention which carry the ester residue of a higher fatty acid in the 17α-position because of their protracted activity are especially useful for the production of the corresponding depot preparations.

The novel testosterone derivatives may be associated with a carrier, which may be either a solid material or a sterile parenteral liquid. As carrier, there can be used substances which do not react with the active substances and which are either pharmacologically inert or are effective as adjuvants, such as for example water, gelatine, lactose, starches, colloidal silicic acid, magnesium stearate, talc, vegetable oils, benzoyl alcohols, gums, polyalkylene glycols, or other known carriers. The pharmaceutical preparations can be, for example, in the form of tablets, dragées, or in liquid form, as solutions, suspensions, or emulsions. They may also be sterilized and/or contain auxiliary substances, such as preserving agents, stabilizing agents, wetting agents, emulsifying agents or buffers. They may also contain other therapeutically valuable substances. The percentage of the active compound in the composition may be varied. It is necessary that the active compound is present in such an amount that a suitable dosage will be obtained. Obviously, several unit dosage forms may be applied at about the same time.

The starting materials for the production of the novel testosterone derivatives according to the present invention can be prepared as follows:

(a) 1,2α-methylene-19-nor-5α-androstane-17β-ol-3-one-acetate 412 mg. of trimethyl-sulfoxonium-iodide were dissolved in 7 ml. dimethyl-sulfoxide. The solution was then admixed with 46 mg. of sodium hydride under an $N_2$ atmosphere. After stirring for 25 minutes under an $N_2$ atmosphere, 500 mg. of 19-nor-$\Delta^1$-5α-androstene-17β-ol-3-one-acetate (produced according to USP 3,007,947) were added, whereupon the mixture was again stirred for 5 hours under nitrogen. The reaction product was then worked up by precipitation with water which had been acidified with acetic acid. The resultant solid was washed with water, dried, and chromatographed on 80 g. silica-gel. 370 mg. of 1,2α-methylene-19-nor-5α-androstane-17β-ol-3-one-acetate were eluted with methylene-chloride/benzene (1:1). After recrystallization from acetic-acid-ester the methylene compound had a melting point of 144–147° C.

(b) 1,2α-methylene-19-nor-5α-androstane-17β-ol-3-one-propionate

Analogous to the method (a) set out above, 3.61 g. of 19-nor-$\Delta^1$-5α-androstene-17β-ol - 3 - one - propionate, obtained by the reaction of 19-nor-$\Delta^1$-5α-androstene-17β-ol-3-one (which compound was produced according to DAS 1,079,040 with propionic-acid-anhydride or according to USP 3,077,947) were reacted with 2.9 g. of trimethyl-sulfoxonium-iodide in 55 ml. dimethyl-sulfoxide in the presence of sodium-hydride. After chromatographing on silica-gel 2.94 g. of 1,2α-methylene-19-nor-5α-androstane-17β-ol-3-one-propionate were obtained having a melting point of 143–144° C. following recrystallization from acetic acid ester.

(c) 1,2α-methylene-17α-ethinyl-19-nor-5α-androstane-17β-ol-3-one-acetate 265 mg. of trimethylsulfoxonium-iodide were dissolved in 5 ml. dimethyl-sulfoxide, and to the solution obtained there were added 57 mg. of a 50% sodium hydride-oil suspension under nitrogen. After stirring for 20 minutes under nitrogen 340 mg. of 17α-ethinyl-19-nor-$\Delta^1$-5α-androstene-17β-ol-3-one acetate were added. After stirring for 5 hours under nitrogen, the methylene compound was precipitated with water acidified with acetic acid. The precipitate was filtered off, washed with water and dried. After the purification by chromatography on silica-gel and recrystallization from methanol, 1,2α-methylene-17α-ethinyl-19-nor-5α-androstane-17β-ol-3-one-acetate having a melting point of 196.5–197.5° C. was obtained. [The 17α-ethinyl-19-nor-$\Delta^1$-5α-androstene-17β-ol-3-one - acetate used as starting material was prepared as follows: In a solution of 2 g. 17α-ethinyl-19-nor-5α-androstane-17β-ol-3-one (obtained according to USP 2,940,989) in 70 ml. of dioxane there were stirred 0.32 ml. bromine within 15–30 seconds, at room temperature. Afterwards, the reaction product was precipitated with ice-water, filtered and washed with water. Yield: 2.39 g. Content of bromine: Calcd. 21.01%; analyzed 20.9%.

The crude brominated product was stirred for 3 hours at 115° C. under nitrogen with 21 ml. dimethylformamide; 8.1 g. calcium carbonate and 3.64 g. of lithium-bromide. The hot reaction mixture was suctioned off and the salts washed with dimethylformamide. The filtrate was stirred into ice-water, the precipitate filtered and washed with water. Yield: 1.63 g. crude product having a melting point of 164–175° C. After fractional filtration on 65 g. of silica-gel and recrystallization from acetic acid ester, the pure 17α-ethinyl-19-nor-$\Delta^1$-5α-androstene-17β-ol-3-one having a melting point of 180.5–182.5° C. was obtained. U.V. $\epsilon_{230}$=10.400. 0.5 g. of 17α-ethinyl-19-nor-$\Delta^1$-5α-androstene-17β-ol-3-one was refluxed for 7 hours under nitrogen with 2 ml. of pyridine and 2 ml. of acetic-acid-anhydride. After the usual working up and recrystallization from hexane, 17α-ethinyl-19-nor-$\Delta^1$-5α-androstene-17β-ol-3-one-acetate having a melting point of 151.5–152° C. was obtained.]

(d) 1,2α-methylene-19-nor-5α-androstane-17β-ol-3-one 265 mg. of trimethyl-sulfoxonium-iodide were dissolved in 15 ml. of dimethyl-sulfoxide. To the solution there were added with stirring and under nitrogen 57 mg. of a 50% sodium-hydride-oil suspension. After stirring for 20 minutes under nitrogen, 274 mg. of 19-nor-$\Delta^1$-5α-androstene-17β-ol-3-one (produced according to DBP 1,079,-040) were added. After stirring for 15 hours the methylene compound was precipitated with ice-water, acidified with acetic acid, filtered off, washed with water, and dried. After purification by chromatography on silica-gel and/or recrystallization from methanol, 1,2α-methylene-19-nor-5α-androstane-17β-ol-3-one having a melting point of 212.5–214° C. was obtained. (The compound may be obtained also by alkaline saponification of the corresponding acetate or propionate.)

The following examples illustrates the process and compounds of the invention and are not to be construed in limitation thereof:

EXAMPLE 1

4.3 g. 1,2α-methylene-19-nor-5α-androstane-17β-ol-3-one-acetate (M.P. 149.5–151° C.; obtained according to (a) above) were heated for 4 hours to boiling with 85 ml. of absolute benzene, 17 ml. of isopropenyl-acetate and 515 mg. of p-toluene sulfonic acid. After cooling to room temperature, the reaction mixture was diluted with acetic acid ester and washed with diluted sodium bicarbonate-, sodium-chloride-solution and water. After drying over sodium sulfate, the reaction solution was evaporated and the residue recrystallized from acetone-hexane. 3.6 g. of enol-acetate having a melting point of 127.5–133° C. were obtained. The enol-acetate in 97 ml. of carbontetrachloride was slowly admixed with 0.49 ml. of bromine in 10 ml. of carbontetrachloride. After 3–5 minutes, the reaction mixture was diluted with acetic-acid ester, washed with diluted sodium bicarbonate solution and water, dried over sodium sulfate and evaporated. The crude bromine compound (3.94 g.) was stirred for 3 hours at 120° C. with 125 ml. dimethyl-formamide, 8.30 g. calcium carbonate and 4.15 g. of lithium-bromide. Afterwards the reaction mixture was sucked through a glass suction filter and the filtrate diluted with acetic acid ester and consecutively washed with diluted hydrochloric acid, diluted sodium bicarbonate solution and water. The residue remaining after drying and evaporation was chromatographed on silica-gel. 1,2-methylene-19-nor-testosterone-acetate having a melting point of 134–135.5° C. (from acetic-acid-ester-hexane) was obtained. U.V. absorption: $\epsilon_{241}$=14.400.

EXAMPLE 2

0.65 g. 1,2α - methylene - 17α - ethinyl - 19 - nor - 5α-androstane-17β-ol-3-one-acetate (prepared according to (c) above) was heated together with 13 ml. absolute benzene, 2.6 ml. isopropenylacetate and 80 mg. p-toluenesulfonic acid for 4 hours under reflux. The resulting mixture was cooled, diluted with acetic acid ester, washed with cold bicarbonate solution, the ester phase dried, and the liquid solvent evaporated under vacuum. The foamy residue comprising 0.72 g. 1,2α-methylene-17α-ethinyl-19-nor-$\Delta^3$-5α-androstene-3,17β-diol-diacetate was dissolved in 17.5 ml. absolute carbon tetrachloride. There was added to this solution under stirring a solution of 302 mg. bromine in 1 ml. carbon tetrachloride; the addition being in dropwise fashion until the bromine solution did not produce more than a momentary coloration. Thereafter, the reaction solution was washed with a bicarbonate solution, the organic phase dried, and the solvent separated by vacuum.

The foamy residue of 0.79 g. 4-brom-1,2α-methylene-17α - ethinyl - 19 - nor - 5α - androstane - 17β - ol - 3 - one-acetate was heated with 1.95 g. calcium carbonate, 0.99 g. lithium bromide and 30 ml. dimethyl-formamide under stirring in a nitrogen atmosphere for 20 hours at a temperature of 120° C. The reaction mixture was cooled, diluted with acetic acid ester, filtered to remove the organic salts, and washed again with acetic acid ester. Following washing with water, dilute hydrochloric acid, water and bicarbonate solution, the filtrate was dried and the dried filtrate evaporated to dryness in vacuum. There was recovered 0.62 g. crude 1,2α-methylene-17α-ethinyl-19-nor-testosterone-acetate having a melting point of 169–171° C. Following filtration over acid $Al_2O_3$ there was recovered from the methylene chloride filtrate after recrystallizing twice from di-isopropyl ether 250 mg. of enalytically pure material having a melting point of 182–183° C.

EXAMPLE 3

1 g. 1,2α-methylene-19-nor-5α-androstane-17β-ol-3-one-(prepared according to (d) above) was heated with 1 g. 2,3 di-chloro-5,6-dicyanbenzoquinone in 40 ml. absolute benzene to boiling for 30–52 hours. The resulting mixture was evaporated in vacuum, the residue taken up in methylene chloride and the methylene chloride solution fractionally filtered over silica-gel. Following evaporation of the filtrate 1,2α-methylene-19-nor-testosterone was recovered.

EXAMPLE 4

1.5 g. 1,2α-methylene-19-nor-5α-androstane-17β-ol-3-one-propionate (prepared according to (b) above) were reacted with isopropenyl acetate according to Example 1. There were recovered following recrystallization from acetic acid ester-hexane 1.2 g. 3-enol acetate-17-propionate having a melting point of 122–124 C., which was brominated and debrominated according to Example 1. Following preparative thin-layer chromatography 850 mg. 1,2α-methylene-19-nor-testosterone-propionate were recovered. After recrystallization from acetic acid ester hexane, the compound melted at 113–114° C. U.V.$\epsilon_{240}$ =14.300.

EXAMPLE 5

288 mg. 1,2α-methylene-19-nor-5α-androstane-17β-ol-3-one (prepared according to (d) above) were dissolved in 12 ml. absolute dioxane and reacted with 0.053 ml. of bromine. After decolorization the mixture was poured into ice-water, 340 mg. of the monobromo compound being recovered. The bromine compound was heated for 45 hours under an argon atmosphere at a temperature of 125° C. with 10 ml. dimethylformamide, 170 mg. lithium bromide, and 170 mg. lithium carbonate. Thereafter, the reaction mixture was poured into water and the precipitate separated off. The crude product thus obtained was purified by preparative thin-layer chromatography. There was recovered 1,2α-methylene-19-nor-Δ⁴-androstene-17-β-ol-3-one which after crystallization from acetic acid ester melted at 216–220° C.

EXAMPLE 6

500 mg. 1,2α-methylene-19-nor-Δ⁴-androstene-17β-ol-3-one-acetate (prepared according to Example 1) were dissolved in 32 ml. tetrahydrofuran. The solution following cooling to −10 to −20° C. was treated with about 1 mol sodiummethylate (3 ml.) solution and stirred for 30 minutes. The reaction solution was heated up to 0° C., reacted with saturated NH₄Cl solution and extracted with ether. There was recovered in approximately quantitative yield, 1,2α-methylene-19-nor-Δ⁴-androstene-17β-ol-3-one, which, after recrystallization from acetic acid ester, melted at 219–222° C. The compound was identical with that of Example 5. The same compound could be obtained by treating in an analogous manner 1,2-α-methylene - 19 - nor - Δ⁴ - androstene - 17β - ol - 3 - one-propionate (prepared according to Example 4).

EXAMPLE 7

200 mg. 1,2α-methylene-19-nor-testosterone (prepared according to Example 5), was warmed for 2 hours, together with 2 ml. pyridine and 2 ml. oenanthic acid anhydride. Water was added to the reaction solution and it was then extracted with ether. The ether solution was successively washed with sulfuric acid, dilute sodium bicarbonate solution, N/10 sodalye and water and then dried. Following drying, the solution was evaporated to dryness. There was recovered 1,2α-methylene-19-nor-testosterone-oenanthate in the form of an oil. U.V.$\epsilon_{239}$ =13.900.

EXAMPLE 8

700 mg. of 1,2α-methylene-19-nor-testosterone (prepared as described in Example 5) were taken up in a mixture of 2.8 ml. of benzene and 1.4 ml. of pyridine. 0.42 ml. of dichloracetyl chloride in 1.4 ml. of benzene were added dropwise at −10 to −5° C. while stirring. The reaction mixture was allowed to stand for four hours at −10 to −5° C., whereupon it was diluted with ether and successively washed with water, 2 N sulphuric acid, water, dilute sodium bicarbonate solution and water and after drying over Na₂SO₄ was evaporated to dryness. 1,2α-methylene-19-nor-testosterone-dichloracetate was obtained in approximately quantitative yield; after recrystallization from acetic acid ester it melted at 145–146° C.

What is claimed is as follows:

1. A 1,2-methylene-19-nor-testosterone derivative of the formula

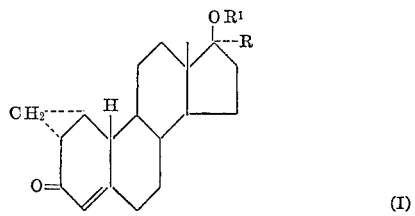

wherein R is a member selected from the group consisting of hydrogen, lower alkyl, vinyl and ethinyl and R¹ is a member selected from the group consisting of hydrogen and acyl.

2. A 1,2α-methylene-19-nor-testosterone-acetate.
3. A 1,2α - methylene-17α-ethinyl-19-nor-testosterone-acetate.
4. A 1,2α-methylene-19-nor-testosterone.
5. A 1,2α-methylene-19-nor-testosterone-propionate.
6. A 1,2α-methylene-19-nor-testosterone-oenanthate.
7. A composition having anabolic activity comprising a compound according to claim 1 as active ingredient in admixture with a pharmacologically acceptable carrier.
8. Method of treating a condition wherein a medicament having anabolic activity but substantially free of androgen activity is indicated comprising administering to a mammal having such condition a therapeutically effective amount of a composition according to claim 7.
9. A 1,2α-methylene - 19 - nor-testosterone-dichloracetate.

References Cited

UNITED STATES PATENTS

| | | | |
|---|---|---|---|
| 3,338,928 | 8/1967 | Beard et al. | 260—397.4 |
| 3,361,773 | 1/1968 | Wiechert | 260—397.4 |
| 3,365,445 | 1/1968 | Wiechert et al. | 260—239.55 |

ELBERT L. ROBERTS, *Primary Examiner.*

U.S. Cl. X.R.

260—397.4, 397.5